(12) United States Patent
Chen et al.

(10) Patent No.: US 10,618,137 B2
(45) Date of Patent: Apr. 14, 2020

(54) AUTOMATED CONSTRUCTING METHOD OF CLOUD MANUFACTURING SERVICE AND CLOUD MANUFACTURING SYSTEM

(71) Applicant: NATIONAL CHENG KUNG UNIVERSITY, Tainan (TW)

(72) Inventors: Chao-Chun Chen, Tainan (TW); Min-Hsiung Hung, Tainan (TW); Po-Yi Li, Taichung (TW); Yu-Chuan Lin, Yunlin County (TW); Yu-Yang Liu, Kaohsiung (TW); Pei-Chen Lee, Tainan (TW); Fan-Tien Cheng, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 84 days.

(21) Appl. No.: 15/928,104

(22) Filed: Mar. 22, 2018

(65) Prior Publication Data
US 2018/0278494 A1 Sep. 27, 2018

Related U.S. Application Data

(60) Provisional application No. 62/475,889, filed on Mar. 24, 2017.

(51) Int. Cl.
*B23Q 17/24* (2006.01)
*G05B 19/4065* (2006.01)
(Continued)

(52) U.S. Cl.
CPC ..... *B23Q 17/2457* (2013.01); *B23Q 17/0971* (2013.01); *B23Q 17/0995* (2013.01); *G01N 3/58* (2013.01); *G05B 13/048* (2013.01); *G05B 19/4065* (2013.01); *H04L 41/5041* (2013.01); *G05B 2219/32214* (2013.01);
(Continued)

(58) Field of Classification Search
CPC ............................ H04L 67/02; H04L 41/5041
See application file for complete search history.

(56) References Cited

U.S. PATENT DOCUMENTS 8,261,295 B1 * 9/2012 Risbood ............. H04L 41/5012
719/328
8,505,005 B1 * 8/2013 Bos .......................... G06F 8/61
717/177
(Continued)

FOREIGN PATENT DOCUMENTS

CN 103582867 A 2/2014

OTHER PUBLICATIONS

Karnouskos et al, "Trends and Challenges for Cloud-based Industrial Cyber-Physical Systems", May 2014. (Year: 2014).*

*Primary Examiner* — Lashonda T Jacobs
(74) *Attorney, Agent, or Firm* — CKC & Partners Co., LLC

(57) ABSTRACT

An automated constructing method of cloud manufacturing service is provided for a distributed system including a virtual machine and a service manager. The method includes: obtaining a library package which is locally built, analyzing the library package to obtain key information, and generating a library information file; automatically generating a project source code file according to the library information file, and generating a web service package according to the project source code file; and deploying, by the service manager, the web service package on the virtual machine.

16 Claims, 12 Drawing Sheets

(51) Int. Cl.
    *G05B 13/04*     (2006.01)
    *B23Q 17/09*     (2006.01)
    *G01N 3/58*     (2006.01)
    *H04L 12/24*     (2006.01)
    *G06T 19/00*     (2011.01)
    *H04L 29/08*     (2006.01)
    *H04L 29/12*     (2006.01)

(52) U.S. Cl.
    CPC .. *G05B 2219/37252* (2013.01); *G06T 19/006* (2013.01); *H04L 61/2007* (2013.01); *H04L 67/02* (2013.01); *H04L 67/10* (2013.01); *H04L 69/325* (2013.01)

(56) References Cited

U.S. PATENT DOCUMENTS

| | | | | |
|---|---|---|---|---|
| 8,819,241 | B1* | 8/2014 | Washburn | H04L 67/34 709/226 |
| 8,949,788 | B2* | 2/2015 | Bonnet | G06F 8/36 715/763 |
| 2004/0117759 | A1* | 6/2004 | Rippert, Jr. | G06F 8/20 717/100 |
| 2005/0125271 | A1* | 6/2005 | Peltz | G06Q 10/06313 705/7.23 |
| 2005/0138634 | A1* | 6/2005 | Luty | G06F 16/95 719/315 |
| 2007/0168940 | A1* | 7/2007 | Lunawat | G06F 8/71 717/108 |
| 2007/0174814 | A1* | 7/2007 | Komissarchik | G06F 8/71 717/115 |
| 2011/0265073 | A1* | 10/2011 | Vidal | G06F 8/65 717/170 |
| 2011/0296396 | A1* | 12/2011 | Kurtakov | G06F 8/71 717/171 |
| 2012/0291009 | A1* | 11/2012 | Khare | G06F 8/38 717/109 |
| 2015/0269130 | A1* | 9/2015 | Huber | G06F 9/451 715/234 |
| 2015/0363175 | A1* | 12/2015 | Klausner | G06F 8/34 717/109 |
| 2016/0224336 | A1* | 8/2016 | Zhou | G06F 8/71 |
| 2016/0315816 | A1* | 10/2016 | Fang | H04L 67/02 |
| 2016/0335067 | A1* | 11/2016 | Narayanan | G06F 9/449 |

* cited by examiner

```
1  {
2      "LibraryName": "tpoga.jar",
3      "PackageList": [
4          {...
5          },                              ⌐ 301
6          ...
7          ,{                                                              ⌐ 302
8              "PackageName": "mmdb.ksa",
9              "ClassList": [
10                 {...
11                 },                      ⌐ 311
12                 ...
13                 ,{                                              ⌐ 312
14                     "ClassName": "TPOGARunner.class",
15                     "MethodList": [
16                         {...
17                         },              ⌐ 321
18                         ...
19                         ,{                                      ⌐ 322
20                             "InputType": "jave.lang.String, Jave.lang.String, int",
21                             "MethodName": "run",
22                             "OutputType": "Double[]"
23                         }
24                     ]
25                 }
26             ]
27         }
28     ]
29 }
```

FIG. 3

```
18      import mmdb.rest.TypeConverter;
19      //ImportJarFile
20
21      //ClassRouteSetting
22      public class RESTAPI_Template {
23
24              private static final Logger logger = Logger.getLogger(RESTAPI_temp
25
26              public void RESTAPI_Template(){}
27
28              //HttpType
29              //MethodRouteSetting
30              public Response MethodName()
31              {
32                      //OutputTypeDefine
33                      Try{
34                              Gson gson = new Gson();
35                              TypeConverter tc = new TypeConverter();
36                              //LoggerStatement
37
38                              //InputTypeDefine
39                              //ClassDefine
40                              //MethodCall
41
42                              //CheckArray
43                              //SuccessReturn
44                      }
45                      catch(Exception e){
46                              logger.log(Level.Severe, e.tostring());
47                              return Response.status(500).entity(e.toString()).build();
48                      }
49              }
```

FIG. 6

```
19  import mmdb.ksa.TPOGARunner;
20
21  @Path("/TPOGARunner")
22  public class TPOGARunner_WebApi {
23
24      @POST
25      @Consumes(MediaType.APPLICATION_JSON)
26      @Produces(MediaType.TEXT_PLAIN)
27      @Path("/run")
28      public Response run(String parameter)
29      {
30          double[ ] result = new double[1000];
31          try{
32              Gson gson = new Gson();
33              TypeConverter tc = new TypeConverter();
34              JSONObject input = new JSONObject(parlaceAll("\\s",""));
34              JSONObject input = new JSONObject(parlaceAll("\\s",""));
35              JSONArray postData = new JSONArray(input.getString("postData"));
36
37              logger.info(parameter);
38
39              String input1 = postDats.get(0).toString();
40              String input2 = postDats.get(1).toString();
41              int input3 = tc.StringToInt(postData.get(2).toString());
42
43              TPOGARunner temp = new TPOGARunner();
44              result = temp.run(input1, input2, input3);
45
46              List<double[ ]> list = new ArrayList<double[ ]> ();
47              if(result.getClass().isArray()==true){
48                  list.add(result);
49              }
50
51              return Response.status(200).entity(gson.toJson(list)).build();
52          }
53          catch(Exception e){
54              logger.log(Level.SEVERE,e.toString());
55              return Response.status(500).entity(e.toString()).build();
56          }
```

FIG. 7

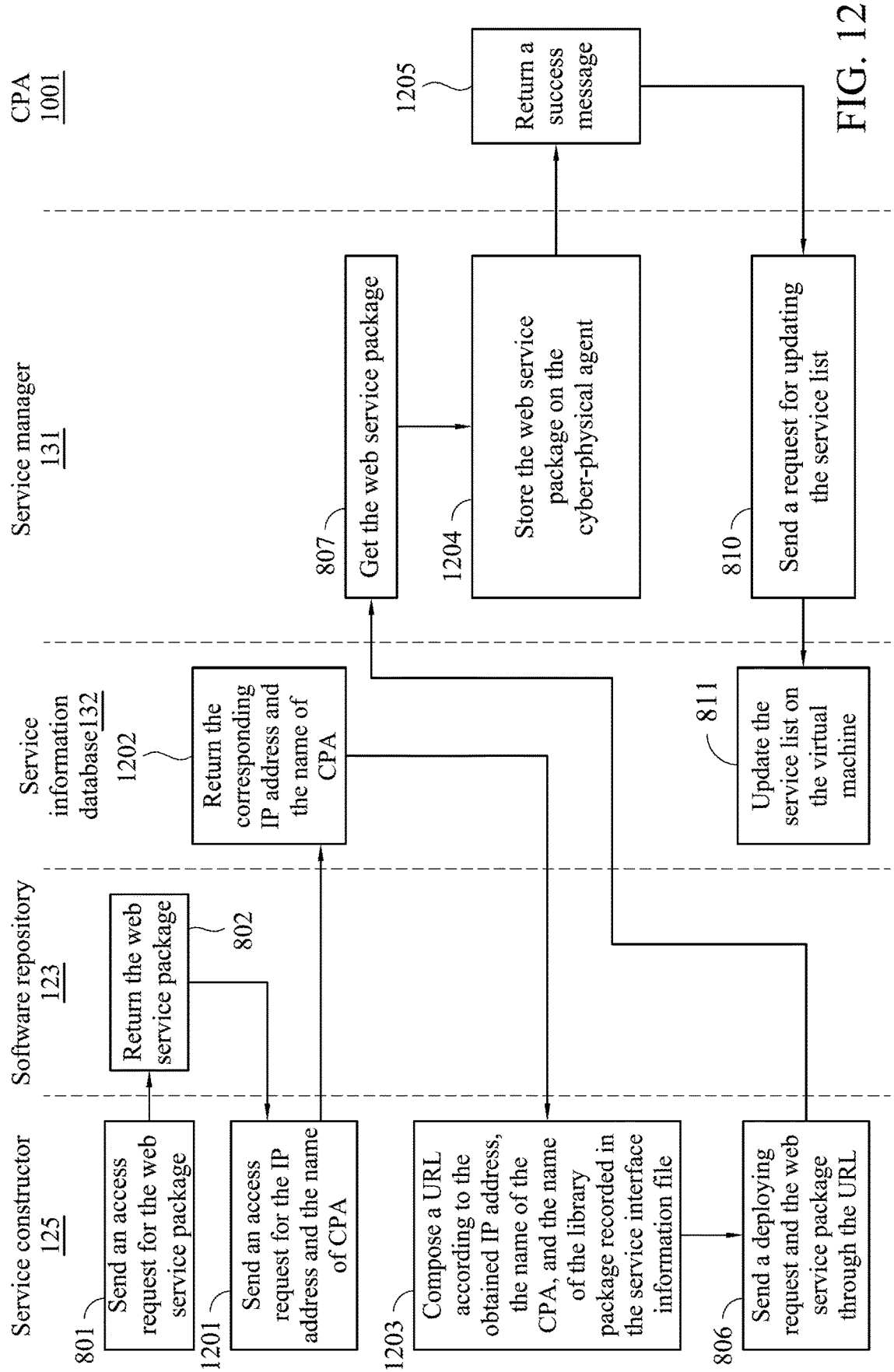

AUTOMATED CONSTRUCTING METHOD OF CLOUD MANUFACTURING SERVICE AND CLOUD MANUFACTURING SYSTEM

RELATED APPLICATIONS

This application claims priority to U.S. Provisional Application Ser. No. 62/475,889, filed Mar. 24, 2017, which is herein incorporated by reference.

BACKGROUND

Field of Invention

The present invention relates to a cloud manufacturing service. More particularly, the present invention relates to a method and a system capable of automatically generating, constructing, and deploying a web service.

Description of Related Art

In the concept of software as a Service (SaaS), a massive computing system in the cloud computing is considered as complex software providing many types of computing services for users. Each computing service may compose of several smaller subroutines which are deployed on the Internet through web servers in virtual machines to form an independent computing resource. The computing system can accomplish a particular computing service through the computing resources, storing resources, and data resources on the Internet. In other words, each independent computing resource may compose of one or multiple subroutine or even one or more computing service in a physical computer or in a virtual machine. When the massive computing system is developed, the subroutines may be developed and tested by different engineers in a local environment. If the cloud service is constructed by transforming these local subroutines into web services, in involves a lot of efforts. For example, if the structure of Representational State Transfer (REST) is adopted, then a development framework of RESTful web service has to be chosen first, the engineer has to learn the technology of this development framework and set a Uniform Resource Locator (URL) route rule of the RESTful web service, and add the locally developed subroutines into a RESTful web service project and manage it, and transforming the RESTful web service project into a web service package, and deploy the web service package on a web server, etc. Therefore, it is an issue in the technical field about an automatic scheme for constructing the cloud manufacturing service.

SUMMARY

Embodiments of the invention provide a method for automatically constructing cloud manufacturing services for a distributed system including a service manager. The method includes: obtaining a library package which is locally built, analyzing the library package to obtain key information, and generating a library information file according to the key information; automatically generating a project source code file according to the library information file, and generating a web service package according to the project source code file; and deploying the web service package, by the service manager, the web service package on a cyber-physical agent (CPA) which is connected to a tool machine.

In some embodiments, the library package includes at least one package including at least one class, and the at least one class includes at least one function. The key information includes a name of the library package, a name of the at least one package, a name of the at least one class, a name of the at least one function, and an output parameter type and an input parameter type of the at least one function.

In some embodiments, the library information file complies with a general data format having a nest structure. The method further includes: providing content of the library information file on a user interface for a user to select the at least one package, the at least one class, and the at least one method to obtain a selected package, a selected class, a selected function; and generating a service interface information file according to the selected package, the selected class, and the selected function, in which the service interface information file complies with the general data format.

In some embodiments, the service interface information file records a library package array including at least one first element. Each of the at least one first element includes: the name of the library package; an application program interface (API) type; and a package array including at least one second element. Each of the at least one second element includes: a name of the selected package; and a class array including at least one third element. Each of the at least one third element includes: a name of the selected the class; and a method array including at least one fourth element. Each of the at least one fourth element includes a name, the output parameter type, and the input parameter type of the selected the function.

In some embodiments, the step of automatically generating the project source code file includes: obtaining a project source code template having multiple annotations; obtaining a code lookup table including columns of annotated key word, tag, code generation format; and with respect to each of the annotations in the project source code template, searching a corresponding annotated key word in the code lookup table, obtaining at least one string from the service interface information file according to a corresponding tag, and insert the at least one string into corresponding code generation format to generate a piece of code, and replacing the corresponding annotation with the piece of code.

In some embodiments, the annotations includes a package import annotation, and the method further includes: with respect to the package import annotation, obtaining a package name and a class name from the service interface information file; and deleting a filename extension of the class name to obtain the at least one string.

In some embodiments, the annotations includes a HyperText Transfer Protocol (HTTP) type annotation, and the method further includes: with respect to the HTTP type annotation, determining whether the selected method has an input parameter; and if the selected method has the input parameter, setting a HTTP verb as "POST", or otherwise setting the HTTP verb as "GET".

In some embodiments, the distributed system further includes a service information database having a list including a name of the CPA, an internet protocol (IP) address, an operating system (OS) type, a package type, and a service status list. The step of deploying the web service package on the CPA includes: sending a request for the IP address and the name of the CPA to the service information database; receiving the IP address and the name of the CPA from the service information database to obtain a received IP address and a received name of the CPA; composing a first Uniform Resource Locator (URL) according to the received IP address, the received name of the CPA, and the name of the library package in the service interface information file; sending a deploying request and the web service package through the first URL; deploying, by the service manager, the web service package on the CPA; and updating, by the service manager, the service information database.

In some embodiments, the method further includes: sending a request for a service list to the service information database; receiving the service list and the name of the CAP from the service information database; selecting a service to undeploy; composing a second URL according to the name of the CPA, the IP address, and a name of the service to undeploy; sending a request to the service manager through the second URL; undeploying, by the service manager, the service to undeploy; and updating, by the service manager, the service information database.

From another aspect, embodiments of the invention provide a cloud manufacturing system including a distributed system, a tool machine, and a cyber-physical agent (CPA). The distributed system includes a service manager and a manufacturing service constructor. The CPA is connected to the tool machine. The manufacturing service constructor obtains a library package which is locally built, analyzes the library package to obtain key information, and generates a library information file according to the key information. The manufacturing service constructor automatically generates a project source code file according to the library information file, generates a web service package according to the project source code file, and deploys the web service package on the CPA through the service manager.

In some embodiments, the library information file complies with a general data format having a nest structure. The manufacturing service constructor performs steps of: providing content of the library information file on a user interface for a user to select the at least one package, the at least one class, and the at least one method to obtain a selected package, a selected class, a selected function; and generating a service interface information file according to the selected package, the selected class, and the selected function, in which the service interface information file complies with the general data format.

In some embodiments, the manufacturing service constructor performs steps of: obtaining a project source code template having multiple annotations; obtaining a code lookup table including columns of annotated key word, tag, code generation format; and with respect to each of the annotations in the project source code template, searching a corresponding annotated key word in the code lookup table, obtaining at least one string from the service interface information file according to a corresponding tag, and insert the at least one string into corresponding code generation format to generate a piece of code, and replacing the corresponding annotation with the piece of code.

In some embodiments, the annotations include a package import annotation. The manufacturing service constructor performs steps of: with respect to the package import annotation, obtaining a package name and a class name from the service interface information file; and deleting a filename extension of the class name to obtain the at least one string.

In some embodiments, the annotations includes a HyperText Transfer Protocol (HTTP) type annotation. The manufacturing service constructor performs steps of: with respect to the HTTP type annotation, determining whether the selected method has an input parameter; and if the selected method has the input parameter, setting a HTTP verb as "POST", or otherwise setting the HTTP verb as "GET".

In some embodiments, the distributed system further includes a service information database having a list including a name of the CPA, an internet protocol (IP) address, an operating system (OS) type, a package type, and a service status list. The manufacturing service constructor sends a request for the IP address and the name of the CPA to the service information database. The manufacturing service constructor receives the IP address and the name of the CPA from the service information database to obtain a received IP address and a received name of the CPA. The manufacturing service constructor composes a first Uniform Resource Locator (URL) according to the received IP address, the received name of the CPA, and the name of the library package in the service interface information file. The manufacturing service constructor sends a deploying request and the web service package through the first URL. The service manager deploys the web service package on the CPA, and updates the service information database.

In some embodiments, the manufacturing service constructor sends a request for a service list to the service information database. The manufacturing service constructor receives the service list and the name of the CAP from the service information database. The manufacturing service constructor selects a service to undeploy. The manufacturing service constructor composes a second URL according to the name of the CPA, the IP address, and a name of the service to undeploy. The manufacturing service constructor sends a request to the service manager through the second URL. The service manager undeploys the service to undeploy and updates the service information database.

BRIEF DESCRIPTION OF THE DRAWINGS

The invention can be more fully understood by reading the following detailed description of the embodiment, with reference made to the accompanying drawings as follows:

FIG. 3 is a schematic diagram illustrating a library information file in accordance with an embodiment.

FIG. 6 is a schematic diagram illustrating a project source code template in accordance with an embodiment.

FIG. 7 is a schematic diagram illustrating a project source code file in accordance with an embodiment.

FIG. 12 is a diagram illustrating a flowchart for deploying a web service package on the cyber-physical agent in accordance with an embodiment.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

In the embodiment, the technology of RESTful web service is adopted to develop a web service, and the developed web service is deployed on a web server. Then, the web service is referred to an independent web resource. Multiple web resources can communicate with each other based on HyperText Transfer Protocol (HTTP).

In general, if an engineer manually constructs a web service by using a library package which is locally built, it involves several steps: i) build a web service project; ii) manage the library package (e.g. import the library package into the Web service project); iii) writing codes to implement a web method; iv) writing codes for setting the route rule for Uniform Resource Locator (URL) of the Application Program Interface (API); v) construct, and compile the web service project; vi) transforming the web service project into a web service package; vii) deploying the web service package on a web server. The step iii) is the hardest among the steps above. A method for automatically constructing a cloud manufacturing service is provided that is capable of automatically generating source codes, and deploying the web service package on a virtual machine.

Figure 1:
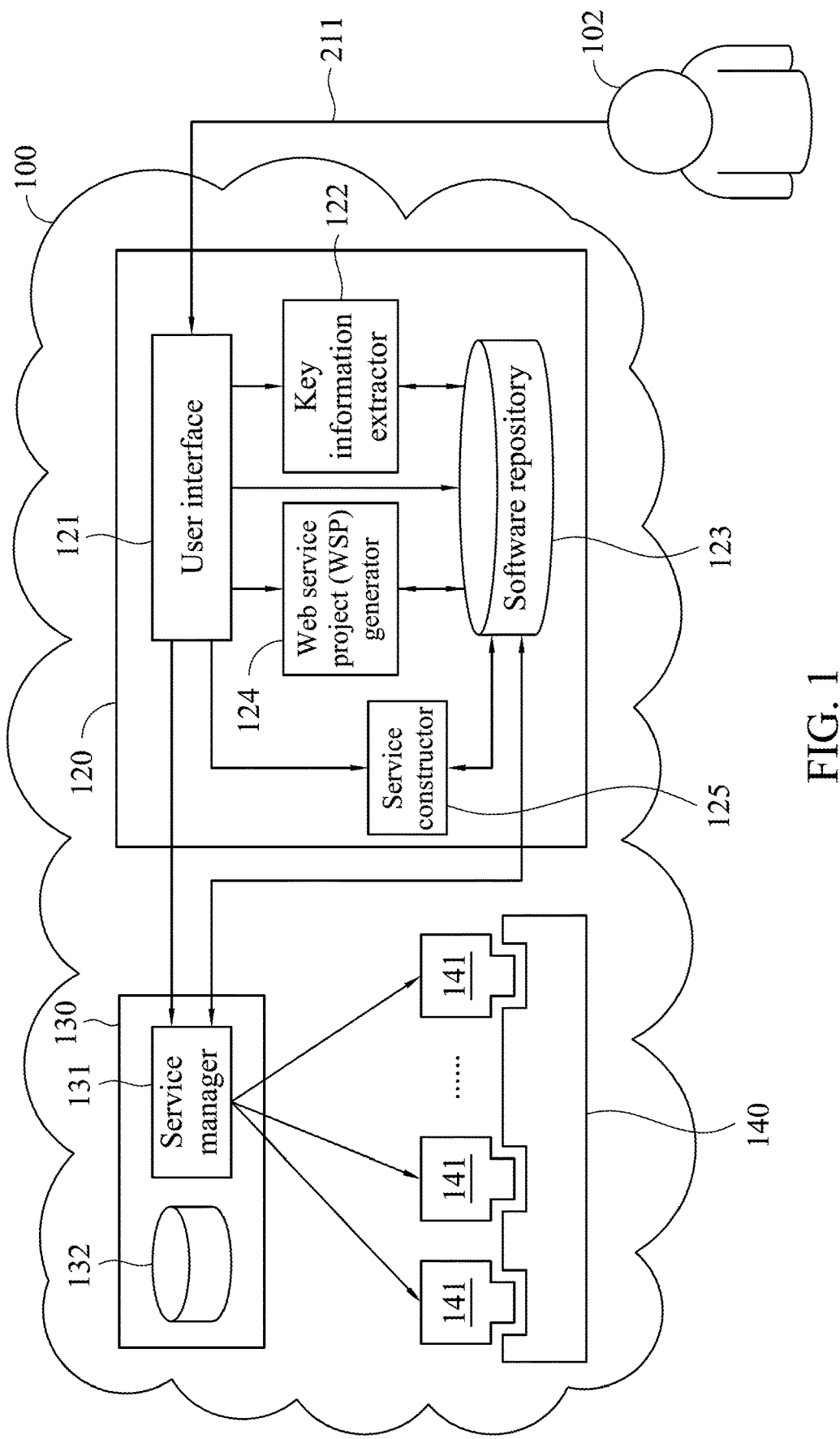
FIG. 1 is a schematic diagram illustrating a distributed system in accordance with an embodiment.

FIG. 1 is a schematic diagram illustrating a distributed system in accordance with an embodiment. A distributed system 100 is also referred to an automated construction scheme of cloud manufacturing service (ACSCMS). The distributed system 100 includes a manufacturing service constructor 120 which is implemented by one or multiple web services. The manufacturing service constructor 120 includes a user interface 121, a key information extractor 122, a software repository 123, web service project (WSP) generator 124, and a service constructor 125, and these modules/units are implemented by one or multiple subroutines or web services. The distributed system 100 further includes multiple virtual machines, but only one virtual machine 140 is shown in FIG. 1 as an example. Multiple services 141 run on the virtual machine 140 to provide any type of manufacturing computing such as extracting manufacturing information, manage and maintain a tool machine, etc. The distributed system 100 further includes a manufacturing service manager 130 which includes a service manager 131 and a service information database 132. The manufacturing service manager 130 may be implemented by one or multiple subroutines or web services. In some embodiments, the manufacturing service manager 130 runs on the virtual machine 140, but it may run on another virtual machine in other embodiments, which is not limited in the invention.

Figure 2:
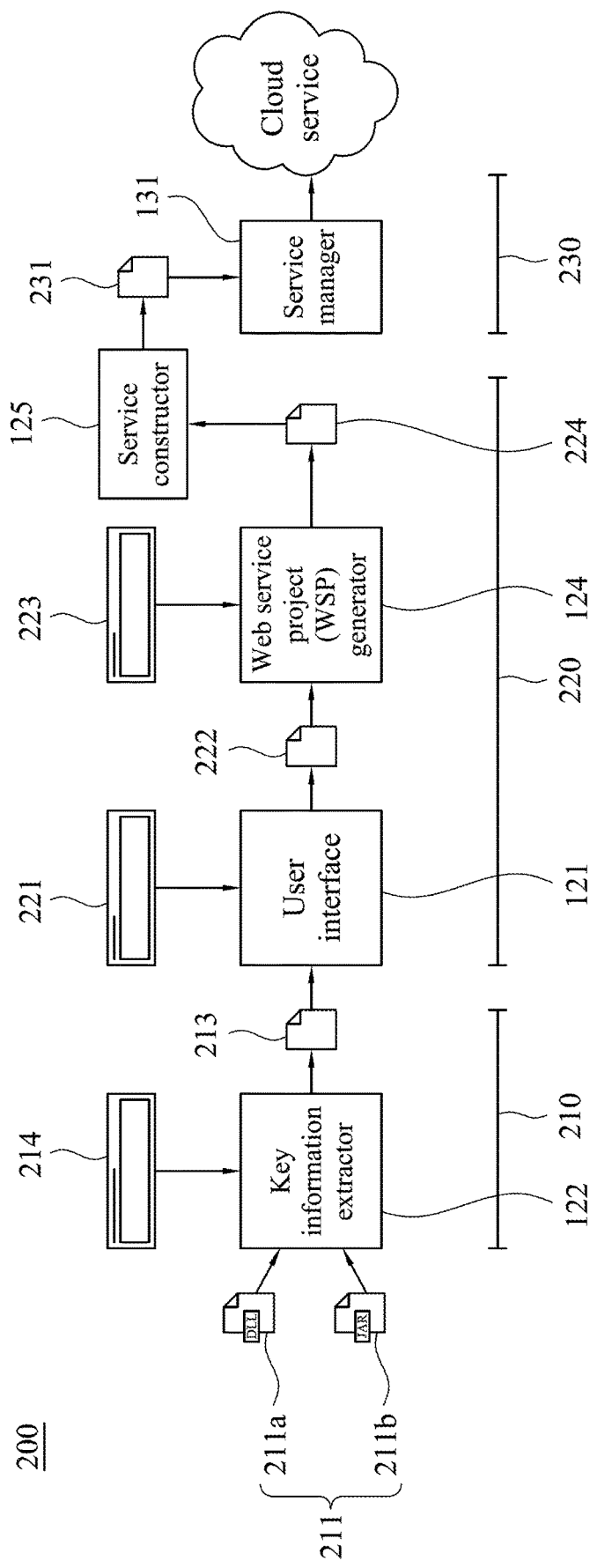
FIG. 2 is a diagram illustrating a workflow of an automated construction scheme of cloud manufacturing service (ACSCMS) in accordance with an embodiment.

FIG. 2 is a diagram illustrating a workflow of the automated construction scheme of cloud manufacturing service (ACSCMS) in accordance with an embodiment. A workflow 200 includes a library analysis phase 210, a service project generation phase 220, and a service construction phase 230 which will be described with reference of FIG. 1 and FIG. 2.

First, a user 102 uploads a library package 211 which is locally built through the user interface 121. The library package 211 may be C # DLL file 211a or JAVA Jar file 211b. However, the library package 211 may be built by any other programming language, which is not limited in the invention. No matter which programming language is used, some information is essential when building a web service project. The essential information includes the name of the library package, HTTP Verb type, the names of imported packages, the names of imported classes, the names of imported functions, and output parameter type and input parameter type of the imported functions. Therefore, the key information extractor 122 analyzes the library package 211 to obtain some key information. To be specific, three layers are obtained no matter the Jar file is analyzed by a Jar parser, or the DLL file is analyzed by JetBrains dotPeekpackage. The first layer includes objects of the library package in which the name of the library package is included. The second layer includes names of packages and a list of classes in the respective package. The third layer includes names of functions, a list of input parameter type, and a list of output parameter type. In the embodiment, the key information extractor 122 obtain the name of the library package, the names of the packages, the names of the functions, and the output parameter type and the input parameter type of the respective method from the library package 211 as the key information which is outputted by a general format as a library information file 213. In detail, the key information extractor 122 refers to a library package information template 214 which may be JavaScript Object Notation (JSON) file having a nest structure. The key information is inserted into the nest structure to obtain the library information file 213.

For example, FIG. 3 is a schematic diagram illustrating the library information file 213 in accordance with an embodiment. Note that in a JSON file, an object starts with "{" and ends with "}". One object includes one or multiple collections of name-value pairs. Each collection is represented as {name:value}. An array starts with "[" and ends with "]" and is represented as [collection, collection]. However, people skilled in the technical field should be able to appreciate the JSON file, and there it will not be described in detail. The name of the library package is recorded in the $2^{nd}$ line of FIG. 3. A package array is recorded in the $3^{rd}$ line, and the array includes several elements 301 and 302. Take the element 302 as an example, names of packages are recorded in the $8^{th}$ line, a class array is recorded in the $9^{th}$ line. The class array includes elements 311 and 312. Take the element 312 as an example, the name of a class is recorded in the $14^{th}$ line, and a method array is recorded in the $15^{th}$ line. The method array includes elements 321 and 322. Take the element 322 as an example, an input parameter type is recorded in the $20^{th}$ line, and the name of the method is recorded in the $21^{st}$ line, and an output parameter type is recorded in the $22^{nd}$ line. The embodiment of FIG. 3 is suitable for .Jar file, but the nest structure may be applied to .dll file or other package file, which is not limited in the invention.

Referring to FIG. 1 and FIG. 2, after the library information file 213 is generated, the library information file 213 is stored in the software repository 123, and then the service project generation phase 220 is entered. In general, only a few functions out of the external package would be used when an engineer develops a cloud manufacturing service, but the library information file 213 includes the complete information of the library package 211. Therefore, a user may select the method he/she needs in the embodiment. In detail, the system would provide the content of the library information file 213 on the user interface 121 (e.g. shown as graphical interface, but the content and the layout are not limited in the invention) for the user to select the packages, the classes, and the functions. Next, a service interface information file template 221 having a nest structure is obtained. The selected package, the selected class, and the selected method are inserted into the nest structure to obtain service interface information file 222.

Figure 4:
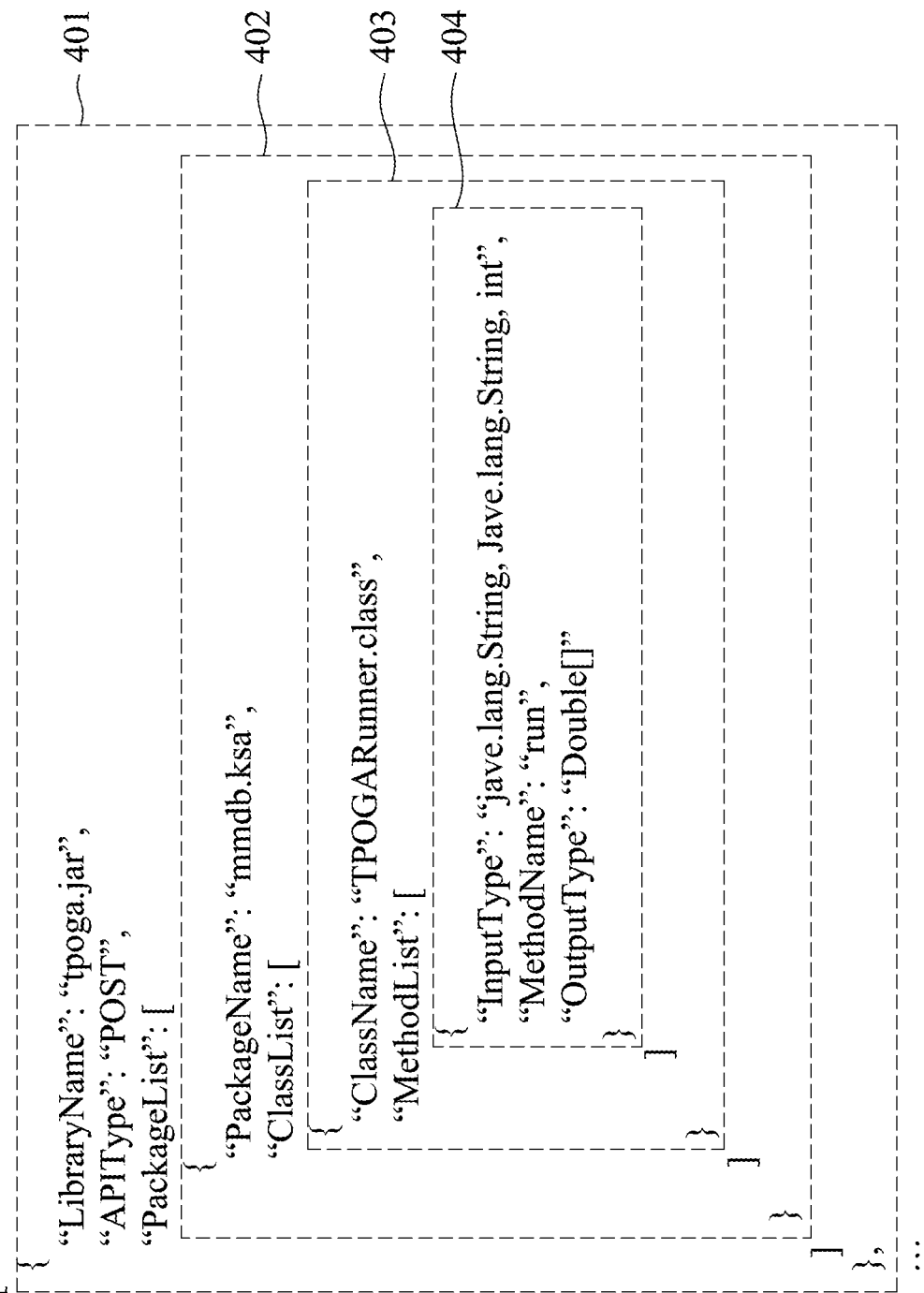
FIG. 4 is a schematic diagram illustrating a service interface information file in accordance with an embodiment.

Note that the service interface information file template 221 and the service interface information file 222 comply with a general data format such as JSON or other format supported by RESTful-based web service. For example, FIG. 4 is a schematic diagram illustrating the service interface information file 222 in accordance with an embodiment. In the embodiment, the service interface information file 222 is a JSON file, and the programming language of JAVA is taken as an example. Referring to FIG. 4, the outermost scope is a library package array including at least one first element (e.g. an element 401) that represents an imported library package. The name of the library package is recorded in the $3^{rd}$ line. API type of "POST" is recorded in the $4^{th}$ line. A package array is recorded in the $5^{th}$ to $21^{st}$ lines. The package array includes at least one second element (e.g. an element 402) that represents a selected package. The name of the selected package is recorded in the $7^{th}$ line, and a class array is recorded in the $8^{th}$ to $19^{th}$ lines. The class array includes at least one third element (e.g. an element 403) that represents a selected class. The name of the selected class is recorded in the $10^{th}$ line, and a method array is recorded in the $11^{th}$ to $17^{th}$ lines. The method array includes at least one fourth element (e.g. an element 404) that represents a selected function. The input parameter type is recorded in the $13^{th}$ line, the name of the selected method is recorded in the $14^{th}$ line, and the output parameter type is recorded in the $15^{th}$ line. The key information can be obtained from the format of FIG. 4.

Figure 5:
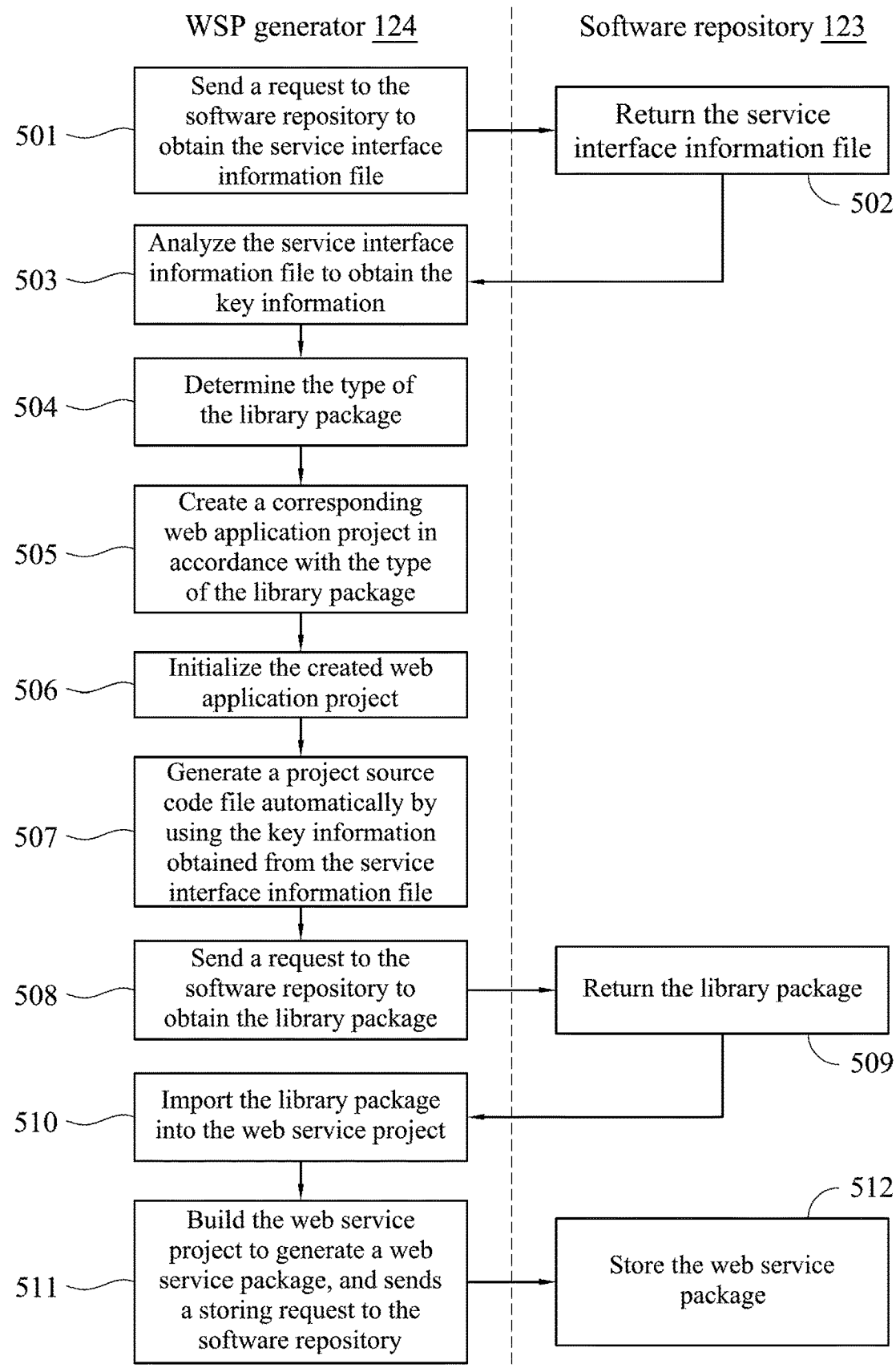
FIG. 5 is a diagram illustrating a flowchart for generating source code of a web service project automatically in accordance with an embodiment.

Referring to FIG. 1 and FIG. 2, the generated service interface information file 222 is stored in the software repository 123. The user may click a bottom of "Construct Service" (or other any suitable graphical object) on the user interface 121, and then the web service project generator 124 performs the flowchart of FIG. 5. Referring to FIG. 5, in step 501, the web service project generator 124 sends a request to the software repository 123 to obtain the service interface information file 222. In step 502, the service interface information file 222 is returned from the software repository 123. In step 503, the web service project generator 124 analyzes the service interface information file 222 to obtain the key information. In step 504, the type (e.g. JAVA or C #) of the library package is determined. In step 505, a corresponding web service project is created in accordance with the type of the library package.

In step 506, the created web service project is initialized. In the embodiment, a project source code template 223 is first obtained. The project source code template 223 includes multiple annotations. For example, FIG. 6 is a schematic diagram illustrating a project source code template written in JAVA in accordance with an embodiment. The $19^{th}$ line is a package importing area for importing the external package. The $21^{st}$ line is a class route setting area. The route setting has to be defined before the class; otherwise a HTTP request would not be directed to the class when the web service is running. The $28^{th}$ and $29^{th}$ lines are a HTTP verb setting area and a method route setting area respectively. The $32^{nd}$ line is an output parameter defining area. The $36^{th}$ line is a logger statement area of the method for recording the log into a file. The user can insert many logger statement areas for debugging. In some embodiments, the logger statement may be omitted. The $38^{th}$ line is an input parameter defining area. The $39^{th}$ line is an external class defining area. The $40^{th}$ line is a method defining area. The $42^{nd}$ line is an area to check the type of an array returned by the method. The return array includes several values, and these returned values have to be processed appropriately. The $43^{rd}$ line is an area to return a success message. The return type of the method is defined as "Response", which is a data type of Jersey package, in the $30^{th}$ line for returning a HTTP status and parameters when the API is called. If the web service executes all codes successfully, it would return the HTTP status and the parameters; if the method is not executed completely, it would jump into an exception handling process in the $45^{th}$ line.

Referring to FIG. 5, in step 507, a project source code file 224 is generated automatically by using the key information obtained from the service interface information file 222. In the embodiment, the web service project generator 124 obtains a code lookup table which includes columns of annotated key word, tag, and code generation format. With respect to each annotation in the project source code template 223, a corresponding annotated key word in the code lookup table is searched, at least one string is obtained from the service interface information file 224 according to a corresponding tag, and the string is inserted to corresponding code generation format to generate a piece of code, and the annotation is replaced with the piece of code. For example, the following table 1 shows the code lookup table of JAVA in which the first column records annotated key words, the second columns records tags, and the third column records code generation format.

TABLE 1

| Annotated key word | Tag | Code generation format |
| --- | --- | --- |
| //ImportJarFile | PackageName, ClassName | Import {PackageName}.{ClassName}; |
| //ClassRouteSetting | ClassName | @Path(/{ClassName}) |
| //HttpType | APIType | @{APIType} |
| //MethodRouteSetting | MethodName | @Path(/{MethodName}) |
| MethodName | MethodName | public Response {MethodName}(String parameter) |
| OutputTypeDefine | OutputType | {OutputType} result = new {OutputType}; |
| //LoggerStatement | — | logger.info(parameter); |
| //InputTypeDefine | InputType | {InputType}input1 = postData.get(0).tostring( ); {InputType}input2 = postData.get(1).tostring( ); |
| //ClassDefine | ClassName | {ClassName} obj = new {ClassName} ( ); |

TABLE 1-continued

| Annotated key word | Tag | Code generation format |
|---|---|---|
| //MethodCall | MethodName | result = temp.{MethodName}(input1, input2); |
| //CheckArray | OutputType | List<{OutputType}> list = new List<{OutputType}>( ); if(result.getClass( ).isArray( )==true){list.add(result);} |
| //SuccessReturn | — | Return Response.status(200).entity(gson.toJson(list)).build( ); |

Referring to FIG. 6 and Table 1, the web service project generator 124 reads the project source code template 223 from up to down. When a package import annotation "//ImportJarFile" is read, the package import annotation is taken as a keyword to search the first column in Table 1 to obtain the values in the second column that are "PackageName" and "ClassName". The service interface information file 224 is searched according to these two values to obtain corresponding strings of package name "mmdb.ksa" and class name "TPOGARunner.class". The two strings are inserted into the corresponding format in the third column. Note that the filename extension of ".class" has to be deleted from the class name to obtain the string "TPOGARunner". Therefore, an appropriate source code of "import mmdb.ksa.TPOGARunner;" is generated. At the end, the annotation of "//ImportJarFile" is replaced with the source code. After all the annotations in the project source code template 223 are processed, a project source code file 224 is obtained as shown in FIG. 7.

It is worth mentioning that the URL route rule of the cloud manufacturing includes HTTP Verb and URL format. With respect to the HTTP Verb, common types of HTTP Verb includes "GET", "POST", "PUT", and "DELETE", but the HTTP Verbs of "PUT" and "DELETE" may have issues on some web servers. Therefore, two principles of the HTTP Verb are set for generality so that it would not be restricted due to web server, and data security and system stability are increased (the system would not be amended by an arbitrary method). The first one is that the HTTP Verb is set as "POST" if the selected method (to be constructed) has an input parameter. The second one is that the HTTP Verb is set as "GET" if the selected method does not have an input parameter. For example, a HTTP type annotation "//HttpType" is written in the $28^{th}$ line of FIG. 6, a respective value of "APIType" is obtained from the second column of Table 1, and a corresponding string is read in the service interface information file 224. The method in the embodiment has three input parameters, and hence the HTTP Verb is set as "POST". After inserting the string "POST" into the format in the third column, a source code "@POST" is obtained.

With respect to the URL format, the URL of API is mainly controlled by three parameters after the service is deployed. The three parameters includes: the name of the web service project, the value set in the class route setting area of FIG. 6, and the value set in the method route setting area of FIG. 6. After replacing the annotations with the source codes, a source code "@Path("/TPOGARunner")" is written in the $21^{st}$ line of FIG. 7, and the source code of "@Path("/run")" is written in the $27^{th}$ line of FIG. 7. Therefore, the URL is "/TPOGARunner_WebApi/TPOGARunner/run" after the service is deployed.

Referring to FIG. 5, in step 508, the web service project generator 124 sends a request to the software repository 123 to obtain the library package 211. In step 509, the software repository 123 returns the library package 211. In step 510, the web service project generator 124 imports the library package into the web service project. In step 511, the service constructor 125 builds the web service project to generate a web service package 231, and sends a storing request to the software repository 123. In step 512, the software repository 123 stores the web service package 231.

Referring to FIG. 1 and FIG. 2, the service construction phase 230 is then entered. The service manager 131 provides services of deploying, undeploying, and querying the web services. In some embodiments, the HTTP verb and URL route rules are set in the following Table 2. The internet protocol (IP) addresses of the virtual machines are different from each other, and therefore each service manager 131 on the respective virtual machine is independent.

TABLE 2

| Verb | URL | description |
|---|---|---|
| POST | http://{VM_IP}:9453/operator/depoly/{filename}/{VM_name} | Deploy service |
| GET | http://{VM_IP}:9453/operator/delete/{filename}/{VM_name} | Undeploy service |
| POST | http://{VM_IP}:9453/operator/get/{VM_name} | Access service |

In addition, the service information database 132 has a service list (shown in the following Table 3) which includes columns of name of virtual machine, IP address, OS type, package type, and service status. The content of Table 3 is merely an example. When querying data in a particular virtual machine, the name of the virtual machine is taken as a key of a relational database. The IP address is used when calling the web service of the service manager 131. The user can get the status of each service according to the information in the column of service status.

TABLE 3

| Name of virtual machine | IP address | OS type | package type | service status |
|---|---|---|---|---|
| Jax_Hadoop_Slave1 | 192.168.0.91 | Linux | Jar | {"ServiceList": "null" } |
| ... | ... | ... | ... | ... |

Figure 8:
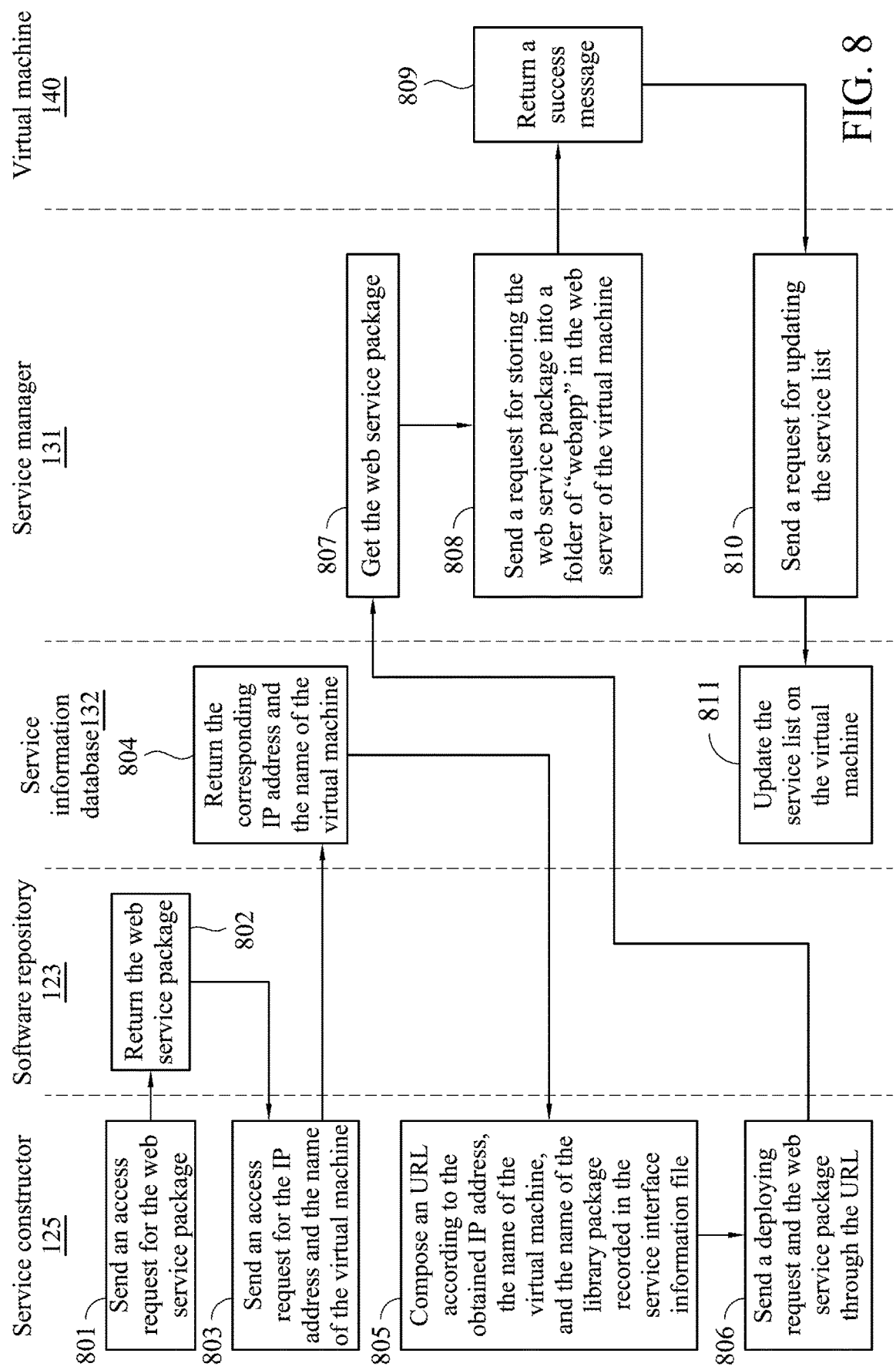
FIG. 8 is a diagram illustrating a flowchart for deploying a web service package.

FIG. 8 is a diagram illustrating a flowchart for deploying a web service package. Referring to FIG. 8, in 801, the service constructor 125 sends an access request for the web service package 231 to the software repository 123. In step 802, the software repository 123 returns the web service package 231. In steps 803, the service constructor 125 sends an access request for the IP address and the name of the virtual machine to the service information database 132. In step 804, the service information database 132 returns the corresponding IP address and the name of the virtual machine. In step 805, an URL (also referred to a first URL) is composed according to the obtained IP address, the name of the virtual machine, and the name of the library package recorded in the service interface information file 222. In step 806, a deploying request and the web service package 231 is sent to the service manager 131 through the URL. In step 807, the service manager 131 gets the web service package 231. In step 808, the service manager 131 sends a request for storing the web service package 231 into a folder of "webapp" in the web server of the virtual machine 140. In step 809, the virtual machine 140 stores the web service package 231 into the "webapp" folder and returns a success message so as to finish the process of deploying. In step 810, the service manager 131 sends a request for updating the service list to the service information database 132. In step 811, the service information database 132 updates the service list on the virtual machine 140.

Figure 9:
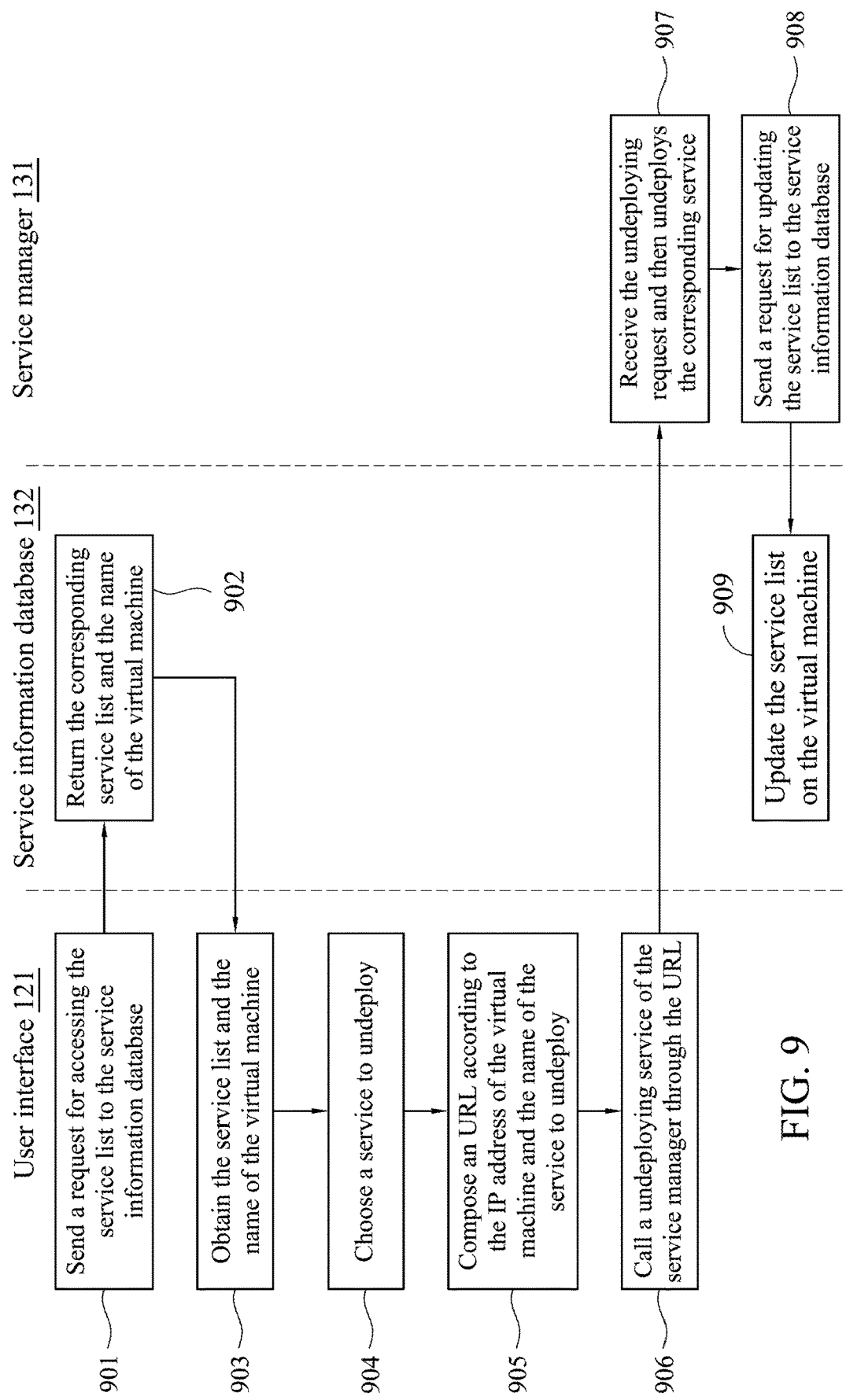
FIG. 9 is a diagram illustrating a flowchart for undeploying the web service package.

FIG. 9 is a diagram illustrating a flowchart for undeploying the web service package. Referring to FIG. 9, in step 901, the user sends, through the user interface 121, a request for accessing the service list to the service information database 132. In step 902, the service information database 132 returns the corresponding service list and the name of the virtual machine 140. In step 903, the user interface 121 obtains the service list and the name of the virtual machine 140. In step 904, the user chooses a service to undeploy. In step 905, an URL (also referred to a second URL) is composed according to the IP address of the virtual machine 140 and the name of the service to undeploy. In step 906, an undeploying service of the service manager 131 is called through its URL. In step 907, the service manager 131 receives the undeploying request and then undeploys the corresponding service. In step 908, the service manager 131 sends a request to updating the service list to the service information database 132. In step 909, the service information database 132 updates the service list on the virtual machine 140.

In the embodiments described above, the web service package is automatically generated, deployed and undeployed. In addition, the user can check the statuses of the services on multiple virtual machines through the service manager 131 and the service information database 132 instead of logging in each virtual machine.

Figure 10:
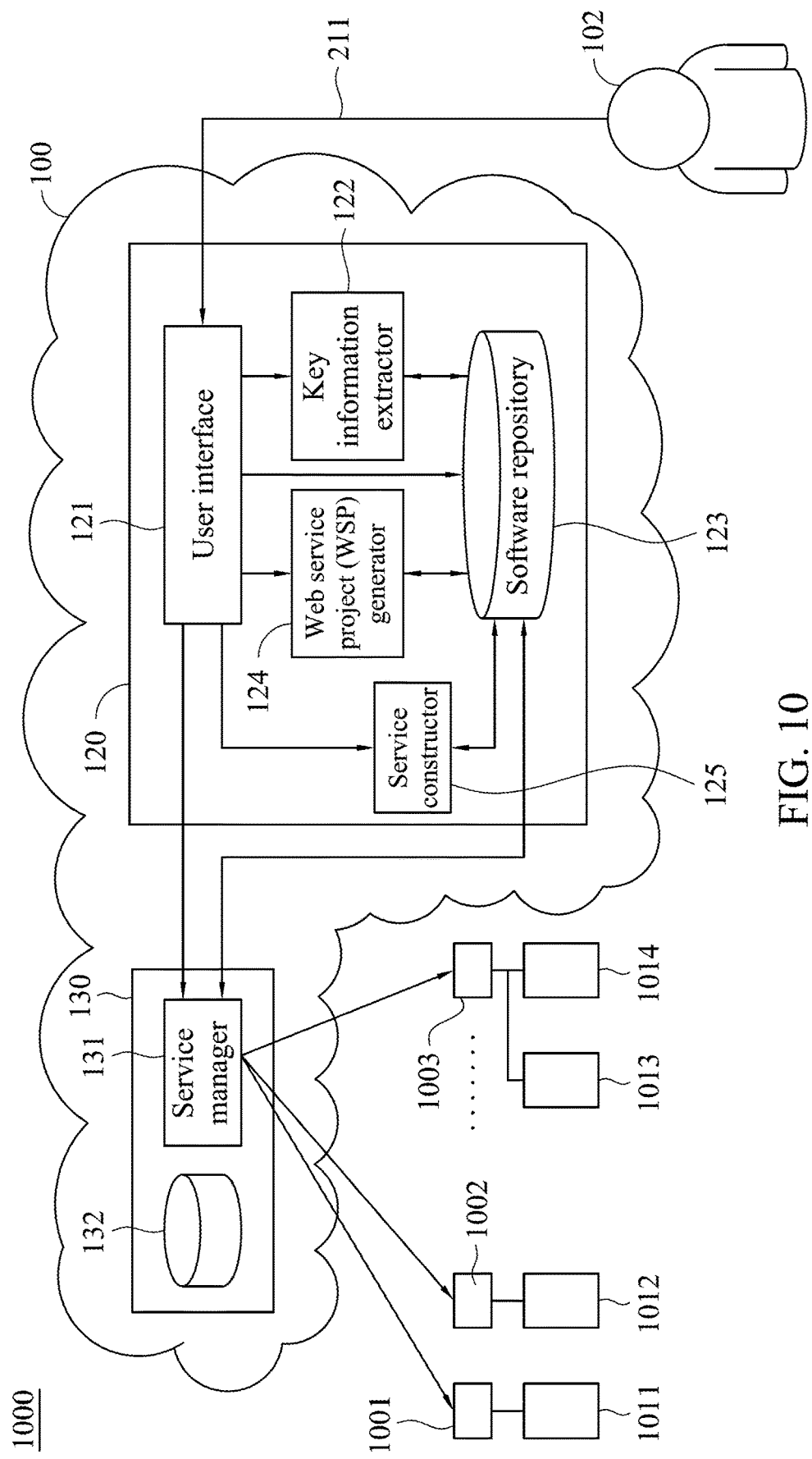
FIG. 10 is a schematic diagram illustrating a cloud manufacturing system in accordance with an embodiment.
Figure 11:
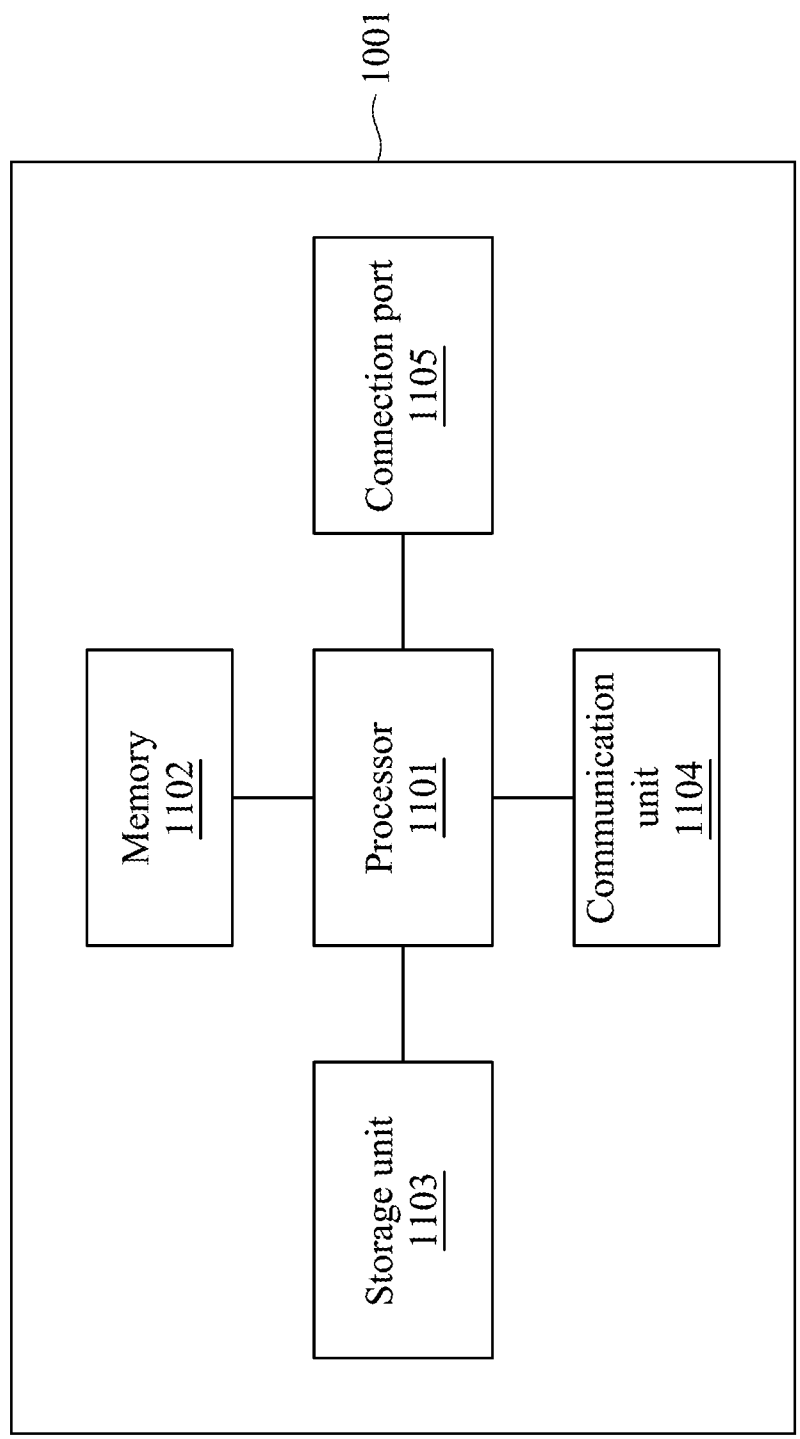
FIG. 11 is a schematic diagram illustrating a cyber-physical agent in accordance with an embodiment.

FIG. 10 is a schematic diagram illustrating a cloud manufacturing system in accordance with an embodiment. The units of FIG. 10 that have the same reference as FIG. 1 are not described again. The difference is that a cloud manufacturing system 1000 includes the distributed system 100, cyber-physical agents (CPA) 1001-1003, and tool machines 1011-1014. In the embodiment, the cyber-physical agent 1001 is coupled to the tool machine 1011, the cyber-physical agent 1002 is coupled to the tool machine 1012, and the cyber-physical agent 1003 is coupled to the tool machines 1013 and 1014. The tool machines 1011-1014 can be any machine in any factory, but the tool machines 1011-1013 do not have modules for connecting to the Internet. FIG. 11 is a schematic diagram illustrating a cyber-physical agent in accordance with an embodiment. Referring to FIG. 11, the cyber-physical agent 1001 is taken as an example. The cyber-physical agent 1001 includes a processor 1101, a memory 1102, a storage unit 1103, a communication module 104, and at least one connection port 1105. The connection port 1105 is configured to connect to one or more tool machines, and the communication module 1104 is, for example, a network card for connecting to the Internet.

Each of the cyber-physical agents 1001-1003 is connected to one or more tool machines for providing web services so that the user can access information of the tool machines 1011-1014 or even control the tool machines 1011-1014 remotely through the cyber-physical agents 1001-1003. In particular, the web services provided by the cyber-physical agents 1001-1003 are generated by the aforementioned method. The method for automatically constructing web service has been described in detail above, and therefore only the difference is described below. Basically, the virtual machine 140 may be replaced with a CPA, and the deployment of the web service is the same. For example, the name of the virtual machine in the Table 2 and Table 3 may be replaced with the name of CAP.

FIG. 12 is a diagram illustrating a flowchart for deploying a web service package on the cyber-physical agent in accordance with an embodiment. Referring to FIG. 12, the steps of FIG. 12 those have the same references as FIG. 8 will not be described again. The difference is that the flowchart of FIG. 12 includes steps 1201 to 1205. In step 1201, an access request for the IP address and the name of CPA is sent to the service information database 132. In step 1202, the service information database 132 returns the corresponding IP address and the name of CPA. In step 1303, a URL is composed according to the obtained IP address, the name of the CPA, and the name of the library package recorded in the service interface information file 222. In addition, in step 1204, the service manager 131 stores the web service package on the cyber-physical agent 1201. For example, the cyber-physical agent 1201 has a folder of "webapp", and the web service package is stored in this folder. In step 1205, the cyber-physical agent 1001 returns a success message. As a result, the tool machine 1011 can connect to the Internet through the web service on the cyber-physical agent 1001, and hence the function of cloud manufacturing is achieved. It is noted that the flowchart of FIG. 12 may be applied to other cyber-physical agents 1002 and 1003.

In some embodiments, the web service on the CPAs 1001-1003 can used for equipment management, data accessing, storage management, utilization rate management, management for the number of finished works, failure notification, operation history recording, estimating delivery day of an order, quality control, manufacturing efficiency optimization, machine health prediction, process accuracy optimization, etc. The services provided by the CPAs 1001-1003 are not limited in the invention.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for automatically constructing cloud manufacturing services for a distributed system comprising a service manager, wherein the method comprises:
obtaining a library package which is locally built, analyzing the library package to obtain key information, and generating a library information file according to the key information;
automatically generating a project source code file according to the library information file, and generating a web service package according to the project source code file; and
deploying the web service package, by the service manager, the web service package on a cyber-physical agent (CPA) which is connected to a tool machine,
wherein the distributed system further comprises a service information database having a list comprising a name of the CPA, an internet protocol (IP) address, an operating system (OS) type, a package type, and a service status list, and the step of deploying the web service package on the CPA comprises:
sending a request for the IP address and the name of the CPA to the service information database;
receiving the IP address and the name of the CPA from the service information database to obtain a received IP address and a received name of the CPA;
composing a first Uniform Resource Locator (URL) according to the received IP address, the received name of the CPA, and the name of the library package in the service interface information file;
sending a deploying request and the web service package through the first URL;
deploying, by the service manager, the web service package on the CPA; and
updating, by the service manager, the service information database.

2. The method of claim 1, wherein the library package comprises at least one package comprising at least one class, and the at least one class comprises at least one function,
wherein the key information comprises a name of the library package, a name of the at least one package, a name of the at least one class, a name of the at least one function, and an output parameter type and an input parameter type of the at least one function.

3. The method of claim 2, wherein the library information file complies with a general data format having a nest structure, and the method further comprises:
providing content of the library information file on a user interface for a user to select the at least one package, the at least one class, and the at least one method to obtain a selected package, a selected class, a selected function; and
generating a service interface information file according to the selected package, the selected class, and the selected function, wherein the service interface information file complies with the general data format.

4. The method of claim 3, wherein the service interface information file records:
a library package array comprising at least one first element, wherein each of the at least one first element comprises:
the name of the library package;
an application program interface (API) type; and
a package array comprising at least one second element, wherein each of the at least one second element comprises:
a name of the selected package; and
a class array comprising at least one third element, wherein each of the at least one third element comprises:
a name of the selected the class; and
a method array comprising at least one fourth element, wherein each of the at least one fourth element comprises a name, the output parameter type, and the input parameter type of the selected the function.

5. The method of claim 4, wherein the step of automatically generating the project source code file comprises:
obtaining a project source code template having a plurality of annotations;
obtaining a code lookup table comprising columns of annotated key word, tag, code generation format; and
with respect to each of the annotations in the project source code template, searching a corresponding annotated key word in the code lookup table, obtaining at least one string from the service interface information file according to a corresponding tag, and insert the at least one string into corresponding code generation format to generate a piece of code, and replacing the corresponding annotation with the piece of code.

6. The method of claim 5, wherein the annotations comprises a package import annotation, and the method further comprises:
with respect to the package import annotation, obtaining a package name and a class name from the service interface information file; and
deleting a filename extension of the class name to obtain the at least one string.

7. The method of claim 5, wherein the annotations comprises a HyperText Transfer Protocol (HTTP) type annotation, and the method further comprises:
with respect to the HTTP type annotation, determining whether the selected method has an input parameter; and
if the selected method has the input parameter, setting a HTTP verb as "POST", or otherwise setting the HTTP verb as "GET".

8. The method of claim 1, further comprising:
sending a request for a service list to the service information database;
receiving the service list and the name of the CAP from the service information database;
selecting a service to undeploy;
composing a second URL according to the name of the CPA, the IP address, and a name of the service to undeploy;
sending a request to the service manager through the second URL;
undeploying, by the service manager, the service to undeploy; and
updating, by the service manager, the service information database.

9. A cloud manufacturing system, comprising:
a distributed system comprising a service manager and a manufacturing service constructor;
a tool machine; and
a cyber-physical agent (CPA) connected to the tool machine,
wherein the manufacturing service constructor obtains a library package which is locally built, analyzes the library package to obtain key information, and generates a library information file according to the key information, wherein the manufacturing service constructor automatically generates a project source code file according to the library information file, and generates a web service package according to the project source code file, wherein the distributed system further comprises a service information database having a list comprising a name of the CPA, an internet protocol (IP) address, an operating system (OS) type, a package type, and a service status list, wherein the manufacturing service constructor sends a request for the IP address and the name of the CPA to the service information database, wherein the manufacturing service constructor receives the IP address and the name of the CPA from the service information database to obtain a received IP address and a received name of the CPA, wherein the manufacturing service constructor composes a first Uniform Resource Locator (URL) according to the received IP address, the received name of the CPA, and the name of the library package in the service interface information file, wherein the manufacturing service constructor sends a deploying request and the web service package through the first URL, wherein the service manager deploys the web service package on the CPA, and updates the service information database.

10. The cloud manufacturing system of claim 9, wherein the library package comprises at least one package comprising at least one class, and the at least one class comprises at least one function, wherein the key information comprises a name of the library package, a name of the at least one package, a name of the at least one class, a name of the at least one function, and an output parameter type and an input parameter type of the at least one function.

11. The cloud manufacturing system of claim 10, wherein the library information file complies with a general data format having a nest structure, wherein the manufacturing service constructor performs steps of: providing content of the library information file on a user interface for a user to select the at least one package, the at least one class, and the at least one method to obtain a selected package, a selected class, a selected function; and generating a service interface information file according to the selected package, the selected class, and the selected function, wherein the service interface information file complies with the general data format.

12. The cloud manufacturing system of claim 11, wherein the service interface information file records:
a library package array comprising at least one first element, wherein each of the at least one first element comprises:
the name of the library package;
an application program interface (API) type; and
a package array comprising at least one second element, wherein each of the at least one second element comprises:

a name of the selected package; and
a class array comprising at least one third element, wherein each of the at least one third element comprises:
a name of the selected the class; and
a method array comprising at least one fourth element, wherein each of the at least one fourth element comprises a name, the output parameter type, and the input parameter type of the selected the function.

13. The cloud manufacturing system of claim 12, wherein the manufacturing service constructor performs steps of:
obtaining a project source code template having a plurality of annotations;
obtaining a code lookup table comprising columns of annotated key word, tag, code generation format; and
with respect to each of the annotations in the project source code template, searching a corresponding annotated key word in the code lookup table, obtaining at least one string from the service interface information file according to a corresponding tag, and insert the at least one string into corresponding code generation format to generate a piece of code, and replacing the corresponding annotation with the piece of code.

14. The cloud manufacturing system of claim 13, wherein the annotations comprise a package import annotation and the manufacturing service constructor performs steps of:
with respect to the package import annotation, obtaining a package name and a class name from the service interface information file; and
deleting a filename extension of the class name to obtain the at least one string.

15. The cloud manufacturing system of claim 13, wherein the annotations comprises a HyperText Transfer Protocol (HTTP) type annotation, and the manufacturing service constructor performs steps of:
with respect to the HTTP type annotation, determining whether the selected method has an input parameter; and
if the selected method has the input parameter, setting a HTTP verb as "POST", or otherwise setting the HTTP verb as "GET".

16. The cloud manufacturing system of claim 9, wherein the manufacturing service constructor sends a request for a service list to the service information database,
wherein the manufacturing service constructor receives the service list and the name of the CAP from the service information database,
wherein the manufacturing service constructor selects a service to undeploy,
wherein the manufacturing service constructor composes a second URL according to the name of the CPA, the IP address, and a name of the service to undeploy,
wherein the manufacturing service constructor sends a request to the service manager through the second URL,
wherein the service manager undeploys the service to undeploy and updates the service information database.

* * * * *